United States Patent [19]
Dissosway et al.

[11] Patent Number: 5,109,543
[45] Date of Patent: Apr. 28, 1992

[54] HARDWARE INTERFACE AND PROTOCOL FOR A MOBILE RADIO TRANSCEIVER

[75] Inventors: Marc A. Dissosway, Forest; Jeffrey S. Childress, Lynchburg, both of Va.

[73] Assignee: General Electric Company, Lynchburg, Va.

[21] Appl. No.: 449,790

[22] Filed: Dec. 13, 1989

Related U.S. Application Data

[62] Division of Ser. No. 85,490, Aug. 14, 1987, Pat. No. 4,903,262.

[51] Int. Cl.$^5$ .............................................. H04B 1/38
[52] U.S. Cl. ................................. 455/170.1; 455/160.1; 455/153.2
[58] Field of Search .................... 455/170, 153, 160

[56] References Cited

U.S. PATENT DOCUMENTS

| | | |
|---|---|---|
| 3,182,207 | 5/1965 | Kaufman . |
| 3,292,178 | 12/1966 | Magnuski . |
| 3,458,664 | 7/1969 | Adlhoch et al. . |
| 3,571,519 | 3/1971 | Tsimbidis . |
| 3,696,210 | 10/1972 | Peterson et al. . |
| 3,801,956 | 4/1974 | Braun et al. . |
| 3,906,166 | 9/1975 | Cooper et al. . |
| 3,936,616 | 2/1976 | DiGianfilippo . |
| 3,943,338 | 3/1976 | Gagniere . |
| 3,970,801 | 7/1976 | Ross et al. . |
| 4,001,693 | 1/1977 | Stackhouse et al. . |
| 4,010,327 | 3/1977 | Kobrinetz et al. . |
| 4,012,597 | 5/1977 | Lynk, Jr. et al. . |
| 4,022,973 | 5/1977 | Stackhouse . |
| 4,027,243 | 5/1977 | Stackhouse . |
| 4,029,901 | 6/1977 | Campbell . |
| 4,065,720 | 12/1977 | Pogue, Jr. . |
| 4,128,740 | 12/1978 | Graziano . |
| 4,131,849 | 12/1978 | Freeburg et al. . |
| 4,184,118 | 1/1980 | Cannalte et al. . |
| 4,220,849 | 9/1980 | Harzer . |
| 4,231,114 | 7/1980 | Dolikian . |
| 4,267,593 | 5/1981 | Craiglow . |
| 4,309,772 | 1/1982 | Kloker et al. . |
| 4,312,070 | 1/1982 | Coombes et al. . |
| 4,312,074 | 1/1982 | Pautler et al. . |
| 4,322,576 | 3/1982 | Miller . |
| 4,326,264 | 4/1982 | Cohen et al. . |
| 4,328,578 | 5/1982 | Bell et al. . |
| 4,339,823 | 7/1982 | Predina et al. . |
| 4,347,625 | 8/1982 | Williams . |
| 4,360,927 | 11/1982 | Bowen et al. . |
| 4,369,443 | 1/1983 | Giallanza et al. . |
| 4,376,311 | 3/1983 | Conger .................... 455/170 |

(List continued on next page.)

OTHER PUBLICATIONS

Federal Information Processing Standards, Pub. No. 46, Data Encryption Standard, U.S. Dept. of Comm., NTIS, (5285 Port Royal Rd., Springfield, Va. 22161).

"Voice and Data Transmission", Arrendondo, Teggeler and Smith, Bell Systems Technology Journal, vol. 58, No. 1, Jan. 1978, pp. 97–122.

"Basic Interfacing Techniques With Extensions," Version 2.0, Hewlett-Packard Co., Chapter 12, pp. 197–256.

"Motorola Data Communications Systems," Sec. 11.0, Sep. 3, 1985.

"Software Specification For CB 6001", Version V1.0, dated Mar. 28, 1985.

Primary Examiner—Douglas W. Olms
Assistant Examiner—Wellington Chin
Attorney, Agent, or Firm—Nixon & Vanderhye

[57] ABSTRACT

A system and method for communicating control signals between a digital mobile transceiver, a digital control head, and a mobile data terminal over a common serial peripheral bus uses a message protocol and architecture which is efficient and yet provides great versatility and functionality without adding undue complexity. As mobile data terminals are becoming increasing important in digital trunked repeater systems, the efficiency provided by the signalling protocol disclosed herein (which is optimized for mobile data terminal messages) is a very important advantage.

11 Claims, 9 Drawing Sheets

U.S. PATENT DOCUMENTS

| | | |
|---|---|---|
| 4,382,298 | 5/1983 | Evans . |
| 4,398,265 | 8/1983 | Puhl et al. . |
| 4,400,585 | 8/1983 | Kamen et al. . |
| 4,409,687 | 10/1983 | Berti et al. . |
| 4,418,425 | 1/1983 | Fennel, Jr. et al. . |
| 4,430,742 | 2/1984 | Milleker et al. . |
| 4,430,755 | 2/1984 | Nadir et al. . |
| 4,433,256 | 2/1984 | Dolikian . |
| 4,434,323 | 2/1984 | Levine et al. . |
| 4,450,573 | 5/1984 | Noble . |
| 4,485,486 | 11/1984 | Webb et al. . |
| 4,578,815 | 3/1986 | Persinotti . |
| 4,590,472 | 5/1986 | Burke et al. . |
| 4,636,791 | 1/1987 | Burke et al. . |
| 4,637,022 | 1/1987 | Burke et al. . |
| 4,654,655 | 3/1987 | Kowalski . |
| 4,684,941 | 8/1987 | Smith et al. . |
| 4,698,805 | 10/1987 | Sasuta et al. . |

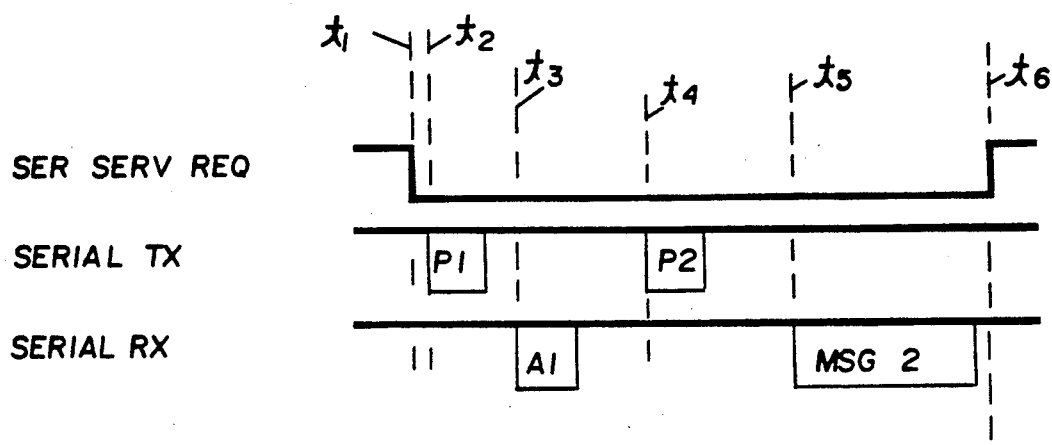
FIG. 3A OPTION ORIGINATED MESSAGE
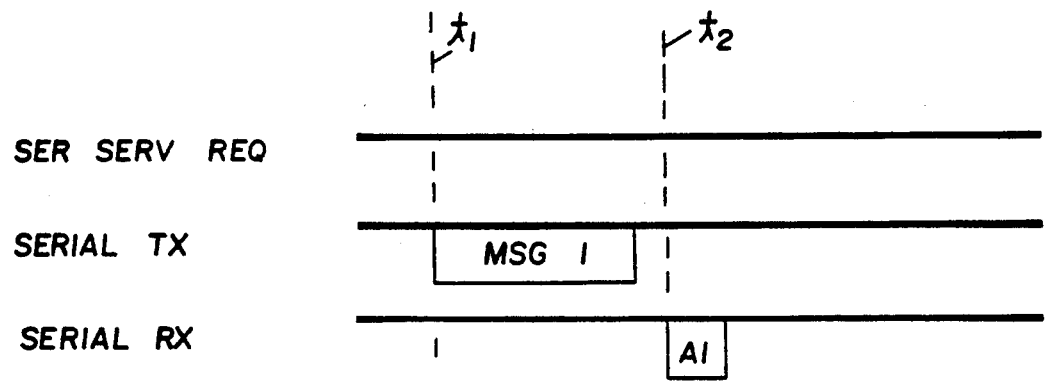
FIG. 3B MOBILE ORIGINATED MESSAGE

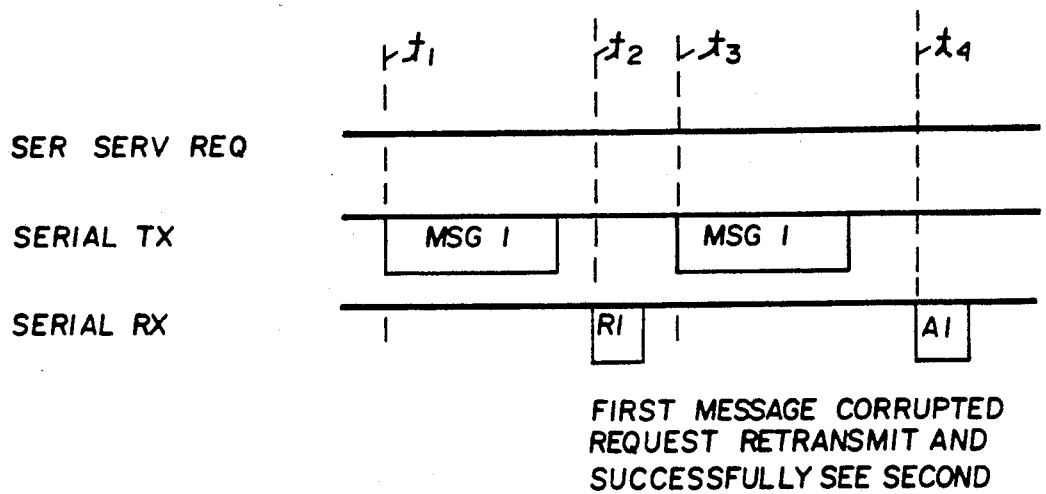
FIG. 3C DATA BLOCK BYTE CORRUPTION
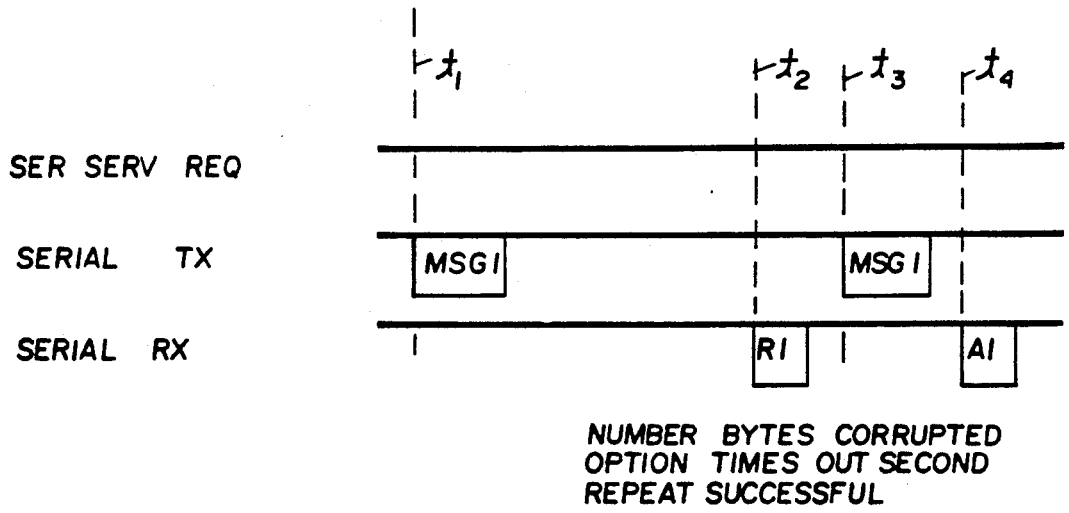
FIG. 3D TYPE/NUMBER BYTES CORRUPTION

| MSG TYPE(3) | UNIT ID (5) | DATA TYPE (2 OR 3) | NO. OF DATA BYTES (5 OR 6) | DATA BYTE 1 | DATA BYTE 2 | ... | DATA BYTE N | CHKSUM |
|---|---|---|---|---|---|---|---|---|
| 575 | 577 | 579 | 581 | 583a | 583b | | 583n | 585 |

FIG. 4

HARDWARE INTERFACE AND PROTOCOL FOR A MOBILE RADIO TRANSCEIVER

This is a division of application Ser. No. 07/085,490, filed Aug. 14, 1987, now U.S. Pat. No. 4,903,262.

This application is related to the following commonly-assigned U.S. patent applications: Application Ser. No. 056,922 of Childress et al filed Jun. 3, 1987 entitled "Trunked Radio Repeater System"; Application Ser. No. 057,046 of Childress et al filed Jun. 3, 1987 entitled " Failsoft Architecture for Public Trunking System"; Application Ser. No. 056,924 of Childress filed Jun. 3, 1987 entitled " Adaptive Limiter/Detector Which Changes Time Constant Upon Detection of Dotting Pattern"; Application Ser. No. 056,923 of Childress et al filed Jun. 3, 1987 entitled " Apparatus and Method for Transmitting- Digital Data Over a Radio Communications Channel"; This application is also related to the following commonly-assigned copending applications filed on Aug. 14, 1987: Application Ser. No. 07/085,572 of Nazarenko et al entitled " Processor-to-Processor Communications Protocol for a Public Service Trunking System"; Application Ser. No. 07/085,663 of Hall et al entitled " Radio Trunking Fault Detection System"; and Application Ser. No. 07/085,491 of Cole et al entitled " A Method for Infrequent Radio Users to Simply Obtain Emergency Assistance". The disclosures of each of those related copending patent applications are also incorporated reference herein.

This invention is generally related to the art of trunked radio repeater systems. The invention more particularly relates to such repeater systems using digital control signals transmitted over a dedicated control channel while also using plural working channels which are assigned temporarily for use by individual mobile radio units.

The trunking of radio repeaters is well known. Early trunking systems used analog control signals while some more recent systems have utilized digital control signals. Control signals have been used on a dedicated control channel and/or on different ones of the working (voice) channels for various different reasons and effects. A non-exhaustive but somewhat representative sampling of publications and patents describing typical prior art trunked radio repeater systems is set forth below:

U.S. Pat. No. 3,292,178 Magnuski (1986)
U.S. Pat. No. 3,696,210 Peterson et al (1972)
U.S. Pat. No. 3,936,616 DiGianfilippo (1976)
U.S. Pat. No. 3,970,801 Ross et al (1976)
U.S. Pat. No. 4,010,327 Kobrinetz et al (1977)
U.S. Pat. No. 4,012,597 Lynk, Jr. et al (1977)
U.S. Pat. No. 4,022,973 Stackhouse et al (1977)
U.S. Pat. No. 4,027,243 Stackhouse et al (1977)
U.S. Pat. No. 4,029,901 Campbell (1977)
U.S. Pat. No. 4,128,740 Graziano (1978)
U.S. Pat. No. 4,131,849 Freeburg et al (1978)
U.S. Pat. No. 4,184,118 Cannalte et al (1980)
U.S. Pat. No. 4,231,114 Dolikian (1980)
U.S. Pat. No. 4,309,772 Kloker et al 1982
U.S. Pat. No. 4,312,070 Coombes et al (1982)
U.S. Pat. No. 4,312,074 Pautler et al (1982)
U.S. Pat. No. 4,326,264 Cohen et al (1982)
U.S. Pat. No. 4,339,823 Predina et al (1982)
U.S. Pat. No. 4,347,625 Williams (1982)
U.S. Pat. No. 4,360,927 Bowen et al 1982
U.S. Pat. No. 4,400,585 Kaman et al 1983
U.S. Pat. No. 4,409,687 Berti et al (1983)
U.S. Pat. No. 4,430,742 Milleker et al (1984)
U.S. Pat. No. 4,430,755 Nadir et al (1984)
U.S. Pat. No. 4,433,256 Dolikian (1984)
U.S. Pat. No. 4,450,573 Noble (1984)
U.S. Pat. No. 4,485,486 Webb et al (1984)
U.S. Pat. No. 4,578,815 Persinotti (1985)

Bowen et al is one example of prior art switched channel repeater systems which avoid using a dedicated control channel—in part by providing a handshake with the repeater site controller from a seized " idle" working channel before communication with a called unit(s) is permitted to proceed.

There are many actual and potential applications for trunked radio repeater systems. However, one of the more important applications is for public service trunked (PST) systems. For example, a single system of trunked radio repeaters may be advantageously used by an entire metropolitan area to provide efficient radio communications between individual radio units within many different agencies. Each agency may, in turn, achieve efficient communication between individual units of different fleets or subunits (e.g., the police department may have a need to provide efficient communications between different units of its squad car force, different portable units assigned to foot patrolmen, different units of detectives who are narcotics agents, and the like). Sometimes it may be important to communicate simultaneously with predefined groups of units (e.g., all units, all squad cars, all foot patrolmen, etc.). At the same time, other agencies (e.g., the fire department, the transportation department, the water department, the emergency/rescue services, etc.) may be in need of similar communication services. As is well known to those familiar with trunking theory, a relatively small number of radio repeaters can efficiently service all of these needs within a given geographical area if they are trunked (i.e., shared on an " as-needed" basis between all potential units).

The potential advantages of trunked radio repeater systems for public services are so well recognized that an organization known as the Association of Public-Safety Communications Officers, Inc. (formerly the Association of Police Communications Officers) (APCO) has developed a set of highly desirable features for such a system commonly known as the " APCO-16 Requirements." A complete listing and explanation of such requirements may be found in available publications known to those in the art.

An advantageous trunked radio repeater system is Ser. No. 056,922 of Childress et al entitled " Trunked Radio Repeater System" filed Jun. 3, 1987. That application describes a trunked radio repeater system architecture in which the RF " control shelf" which receives and transmits radio frequency signals for a particular working or control channel is controlled by a microprocessor-based " trunking card" (hereafter referred to as a " GETC"—General Electric Trunking Card) which performs the signal processing functions associated with the control shelf and RF channel. A primary site controller (e.g., a minicomputer) is connected to various trunking cards, and receives digital signals from and sends digital signals to the various trunking cards. The primary site controller performs the control functions of the system (during normal system operations)—and thus performs tasks such as call logging, dynamic regrouping, and " patch" coordination as well as other, more routine control functions such as assigning channels to new calls. One or more dispatch consoles also connected to the primary site controller generate messages controlling the primary site controller and also monitor the status of the entire system via messages sent to it from the site controller.

In order to provide as much flexibility as possible to mobile radio transceiver users, mobile radio transceiver installations should be configurable in a variety of different ways. Not so long ago, mobile radio transceiver installations were limited to a trunk-mounted mobile radio transceiver unit connected via a multiple conductor cable to a dashboard-mounted control head. The control head was typically relatively simple, including only an ON-OFF switch, a volume control, a microphone with associated PTT (push to talk) and hook switches, a speaker, and receive/transmit indicator lamps, and a channel selector switch. The limited control functions provided by this type of simple control head were typically implemented with independent control lines of the multiconductor cable (e.g., the ON/OFF switch was connected to a dedicated control cable conductor, the volume control typically had its own conductor(s), the receive and transmit indicator lamps had respective dedicated conductors, etc.).

Modern " digital" mobile radio transceivers (i.e., transceivers controlled by microprocessors) are not limited to the crude control functions provided in mobile radio transceivers of the past, and are capable of interfacing with a variety of different types of equipment. For example, modern digital radio transceivers include much internal digital control circuitry (e.g., digitally-controlled frequency synthesizers, digital displays, etc.) and can be interfaced with a wide variety of different types of external equipment commonly called " options" (e.g., mobile data terminals, multiple digital control heads, and the like).

One possible way to connect such " options" to a digital radio transceiver is to provide dedicated ports on the transceiver for each type of device to be connected to it. This solution is generally unsatisfactory due to the large number of different types of devices a user may wish to connect to a particular radio transceiver. The alternate solution of customizing particular radio transceivers at the factory to interface with specific devices increases manufacturing costs and limits users to only those options anticipated at time of purchase.

A better design approach provides a general purpose serial bus within the architecture of a radio transceiver to which different types of " options" can be connected. One solution used involves a serial data bus which connects the internal microprocessor of the radio transceiver to one or more external " option" units.

Of course, serial data buses are generally old in the art. See, as one example, the publication " Basic Interfacing Techniques With Extensions", Version 2.0, Hewlett-Packard Co., Chapter 12, pages 197-256, which describes a serial data bus interface between a computer and external devices. The following (by no means exhaustive) listing of prior issued U.S. patents and prior publications are generally relevant in disclosing mobile radio transceiver architectures which include such general purpose serial data buses:

U.S. Pat. No. 4,637,022 to Burke et al (1987)
U.S. Pat. No. 4,654,655 to Kowalski (1987)
U.S. Pat. No. 4,398,265 to Puhl et al (1983)
U.S. Pat. No. 4,328,578 to Bell et al (1982)
" Motorola Data Communications Systems" Sec. 11.0 (Sept. 3, 1985).

U.S. Pat. No. 4,637,022 listed above describes a digital mobile radio transceiver including a serial data bus which connects the mobile transceiver microprocessor to various peripheral units. The serial data bus includes a transmit line for transmission of a serial data stream from the microprocessor to the peripheral devices, a receive line for transmission of a serial data stream from the peripherals to the microprocessor, and a BUSY line used to prevent more than one peripheral from transmitting on the receive line at any given time. A specialized message protocol is used to communicate messages between the microprocessor and the control head connected on the serial bus.

Although digital mobile radio architectures including general purpose serial data buses for interfacing with one or more peripheral " option" units are already generally known by those skilled in this art, further improvements are possible.

For example, it is desirable to provide as much flexibility and functionality as possible in a mobile radio serial peripheral bus architecture and associated bus protocol without making software programming inefficient and proliferating more bus commands (with their associated complexity) than needed. Many trade-offs are involved in choosing between complexity and functionality, and the choices that are made can have important impact on the long range costs of fabricating, manufacturing, troubleshooting and repairing transceivers for many years into the future, and also directly impact how users interface their transceivers to peripheral devices.

Another area of improvement lies in the connection of a mobile data terminal to a transceiver serial peripheral bus. Mobile transceiver users often wish to connect a mobile data terminal to their radio transceivers and use the transceivers for both the communication of digital data and for voice communications. Hence, a mobile radio transceiver configuration which is becoming increasingly popular includes a radio transceiver connected to both a digital control head and a mobile data terminal (the control head being used for voice communications and the mobile data terminal, or " MDT", being used for communication of digital signals).

Mobile data terminals can be used for a variety of different functions in a vehicle (e.g., to send and receive text messages, to receive graphics such as maps and charts) —and generally are useful to perform practically any task that can be performed by a conventional display terminal connected to a computer. Unfortunately, past mobile radio transceiver architectures and peripheral bus protocols were typically not optimized for mobile data terminals, and therefore did not provide the required flexibility and/or required costly external interface components (even entire independent transceivers) for use with such terminals.

In contrast, the present invention provides a system and method for communicating control signals between a digital mobile transceiver, a digital control head, and a mobile data terminal over a common serial peripheral bus. The message protocol and architecture provided by the present invention is efficient and yet provides great versatility and functionality without adding undue complexity. These advantageous features have become very important as mobile data terminals become integral parts of trunking systems.

BRIEF DESCRIPTION OF THE DRAWINGS

These and other features and advantages of the present invention will be better and more completely appreciated by studying the following detailed description of presently preferred exemplary embodiments in conjunction with the attached sheets of drawings, of which:

FIGS. 3A-3D are timing diagrams of exemplary signalling carried by the three-wire serial bus shown in FIG. 2;

FIG. 4 is a schematic diagram of an exemplary serial data bus message format;

DETAILED DESCRIPTION OF THE PRESENTLY PREFERRED EXEMPLARY EMBODIMENTS

Overall System Architecture

Figure 1:
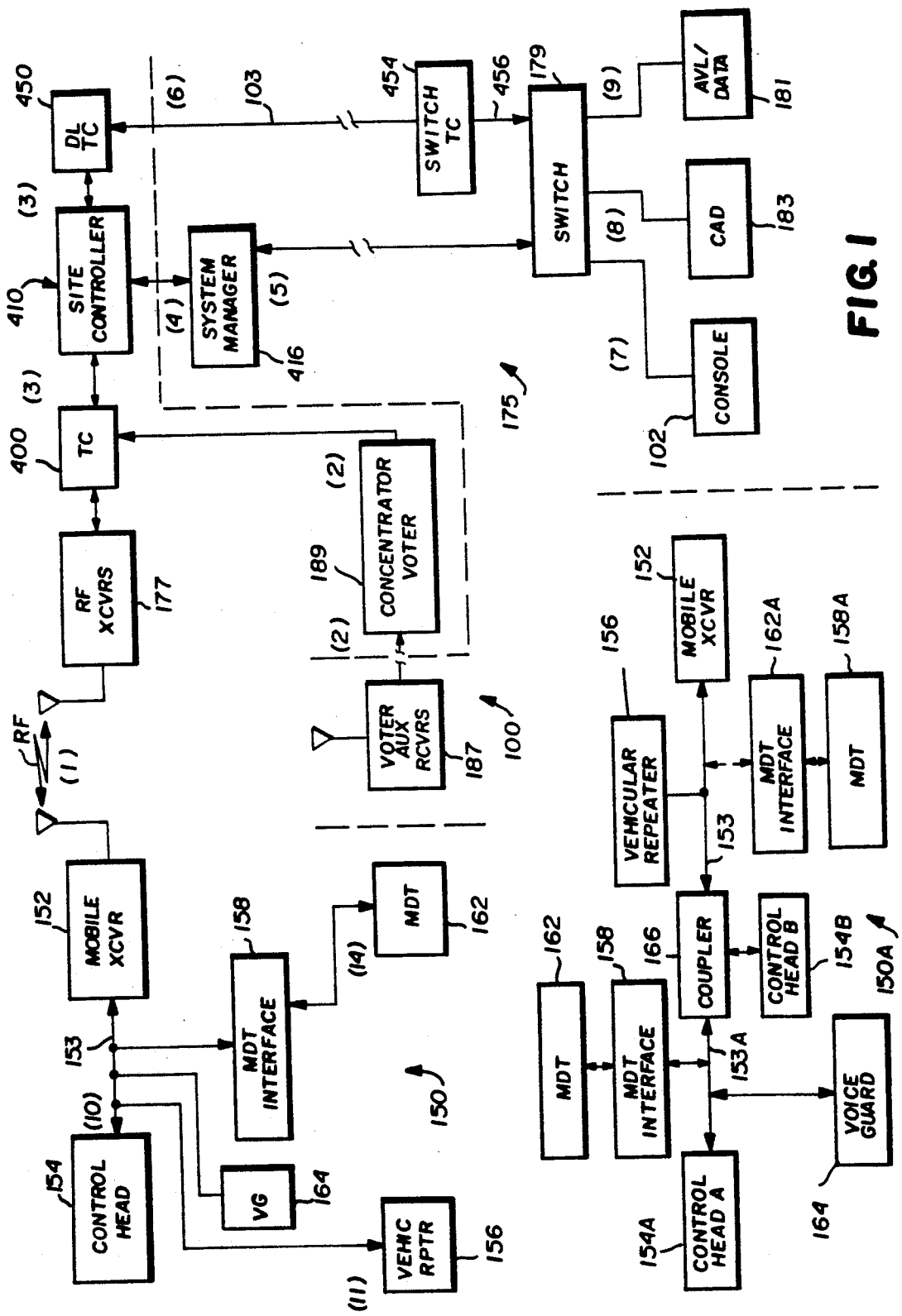
FIG. 1 is a schematic block diagram of an overall trunked radio repeater system 100 of the present invention.

An exemplary trunked radio repeater system 100 in accordance with this invention is generally depicted in FIG. 1. System 100 includes at least one (and typically many) mobile (or portable) radio transceiving stations 150 and an RF repeater station 175. Mobile transceiving station 150 communicates via an RF link and repeater station 175 with other mobile transceiving stations and/or with landbased parties connected to the repeater station by conventional dial-up landlines.

Repeater station 175 includes a site controller 410, individual repeater channel transceivers 177, and a multiplexing telephone interconnection network ("switch", or "MTX") 179. Site controller 410 is preferably a high performance digital computer which oversees the general operation of repeater station 175. In particular, site controller 410 controls the operation of RF transceivers 177 by transmitting digital signals to and receiving digital from "trunking cards" ("TC") 400 connected between the site controller and individual transceivers (although only one transceiver 177 and one trunking card 400 are shown in FIG. 1, there typically are many such trunking card/transceiver combinations in repeater station 175—one for each RF channel the repeater station operates on.

Site controller 410 communicates with one or more dispatch consoles 102 via a "downlink" 103 which includes a "downlink" trunking card 450 and a "switch" trunking card 454. The downlink 103 also typically is channeled through switch 179. Also connected to switch 179 are AVL (automatic vehicular locating system) 181 and CAD (computer aided dispatch system) 183. A system manager console/computer station 416 is connected to site controller 410 and to switch 179 to allow a system manager to oversee and control the overall operation of system 100.

A remote receiver 187 and associated concentrator/voter 189 may be connected to trunking cards 400 to allow so-called "RSSI" signal strength measurements to be based on the stronger of the signal level received at the central repeater station site and the signal level received at a remote site—thereby increasing the reliability of such measurements.

An RF link ("RF") connects RF transceivers 177 with mobile transceiving station(s) 150. Mobile station 150 is capable of transmitting digitized voice or digital data signals (encrypted or unencrypted) to and receiving such signals from repeater station 175 over the RF link.

In the configuration shown in the upper left-hand portion of FIG. 1, mobile station 150 includes a mobile RF transceiver 152 connected to a control head 154 via a serial digital data bus 153. Mobile transceiver may also be connected to a vehicular repeater 156 via the serial bus. A mobile data terminal interface 158 may connect the serial bus to a mobile data terminal (MDT) 162, or if desired, the MDT may be connected directly to the serial bus. A separate digital voice guard module 164 performs data encryption and decryption on digitized voice and/or digital data signals using the conventional DES algorithm (or equivalent).

In the alternate mobile radio configuration shown in the lower left-hand corner of FIG. 1, a coupler 166 is used to connect dual control heads 154A, 154B to serial bus 153. In this configuration, a mobile data terminal 162 and associated interface 158 may be connected directly to serial bus 153 and/or to bus 153A (on the output of the coupler 166). Voice guard module 164 is preferably connected to bus 153A when dual control heads 154A, 154B and associated coupler 166 are used.

As illustrated, individual radio units (mobile or portable radio transceivers) of various groups communicate with one other (both within and possibly outside of their own groups) via shared radio repeater channels. A dispatch console 102 supervises the operation of repeater system 102. There may be multiple dispatch consoles 102 (one for each separate fleet of mobile/portable units) and a master or supervisory dispatch console for the entire system if desired.

Overall Description of Mobile Transceiver 152

The 16-PLUS MOBILE RADIO TRANSCEIVER 152 used in the preferred embodiment is a microprocessor-controlled digital radio transceiver having a variety of advanced functions and using the RF signalling protocol described in copending commonly-assigned application Ser. No. 065,922 of Childress et al entitled "Trunked Radio Repeater System" filed Jun. 3, 1987.

Figure 2:
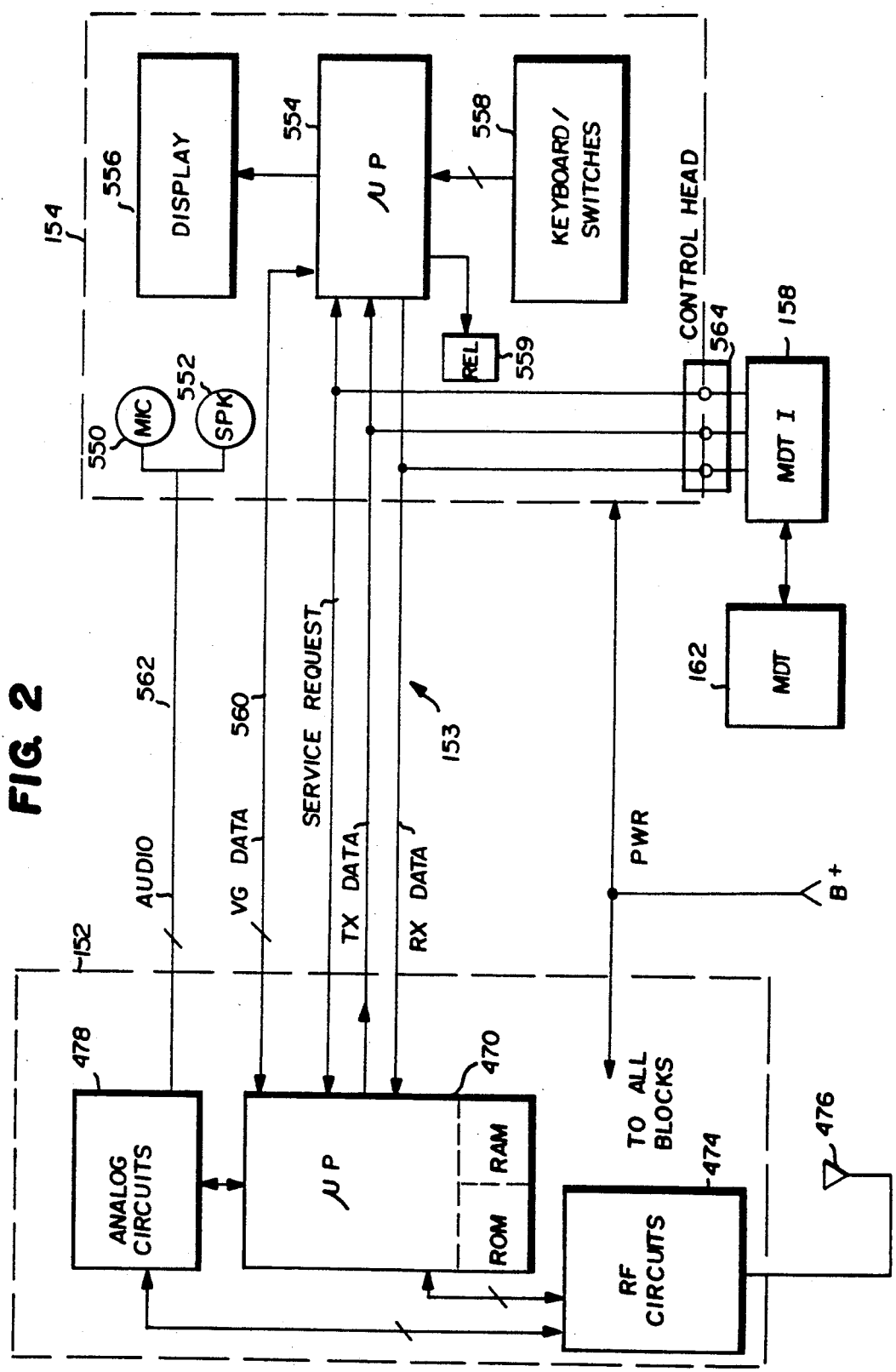
FIG. 2 is a more detailed schematic block diagram showing the internal components of the mobile radio transceiver 152 and control head 154 and the interface between the transceiver and the control head.

FIG. 2 is a schematic diagram of transceiver 152, control head 154, and the interface between the two. Transceiver 152 includes microprocessor 470 (an 8031 microprocessor in the preferred embodiment) including internal or external read only memory, random access memory, and electrically eraseable programmable read only memory (EEPROM) devices (the EEPROM device storing "personality" data specifying parameters of repeater systems 100 mobile transceiver 152 is authorized to access and also storing program control instructions which control the microprocessor to perform predetermined control tasks under software control). Transceiver RF circuits 474 receive RF signals from an antenna 476, demodulate those RF signals to extract the intelligence they carry, pass resulting received analog signals to analog circuits 478, and pass received digital signals to the microprocessor 470. RF circuits 474 similarly receive digital signals from microprocessor 470 and analog signals from analog circuits 478, produce an RF signal, modulate the RF signal with these analog and digital signals, and transmit the modulated RF signals (after amplification) to the repeater system via antenna 476.

The structure and operation of analog circuits 478 and RF circuits 474 are conventional and well understood by those skilled in this art. Briefly, analog circuits 478 include an audio multiplexer which selects between various audio inputs (e.g., the audio produced by control head microphone 550, decrypted voice guard audio information provided by voice guard module 164, receiver audio provided by RF circuits 474, and alert tones provided by microprocessor 470). Analog circuits 478 also include a summing device which sums the selected audio input with various digital signals provided by microprocessor 470, a level adjusting circuit which adjusts the level of the summed analog signal, and various amplifier/limiter stages which prepare the level-adjusted signal for use by RF circuits 474 to modulate the RF carrier and/or for application to control head speaker 552. RF circuits 474 include a conventional digitally-controlled frequency synthesizer controlled by digital data signals produced by microprocessor 470 and conventional RF transmitting and receiving circuitry (e.g., an intermediate frequency " strip" connected to an FM demodulator/detector, and an RF transmitter and associated modulating and RF amplifier stages).

Control head 154 includes its own microprocessor 554, a digital data display 556, a keyboard 558, and a relay 559. Audio lines 562 connect control head microphone 550 and control head speaker 552 to transceiver analog circuits 478.

Serial data bus 153 is connected between transceiver microprocessor 470 and control head microprocessor 554, and is also connected to a MDTI connector 564 mounted on the control head 154. Mobile data terminal interface (MDTI) 158 is in turn connected to connector 564, and mobile data terminal (MDT) 162 is connected to the MDTI.

Serial data bus 153 carries control commands and data between transceiver 152, control head 154 and MDTI 158 (and also between the transceiver and any other " options" connected to the transceiver). In the preferred embodiment, serial data bus 153 includes three lines: an RX data line (which carries commands and data digital signals from the " options" to transceiver microprocessor 470); a TX data line (which carries command and data digital signals from the transceiver microprocessor to the " options"); and the SERVICE REQUEST line (which is used by the " options" to request control of the transceiver RX data line in preparation for transmitting signals to the transceiver microprocessor.

The following is a more detailed description of the hardware interconnections between control head 154 and transceiver 152.

Hardware Interface Between Transceiver and Control Head

The interface between the 16-PLUS mobile transceiver 152 and its options includes 38 pin GE Delta connectors (these connectors already exist and have been proven to meet all the requirements for mechanical and electrical operation). The actual interconnecting cable, which contains only 18 wires, terminated in a single 19 pin connector in the preferred embodiment.

A detailed description of the conductors connecting transceiver 152 with external peripheral " option" devices (e.g., control head 154, MDT interface 158, vehicular repeater 156 and/or MDT 162) is given below:

SW A+, A— (#16 wire, twisted pair): provides switched power to transceiver 152 and all options.

SPRK1, SPKR2 (#16 wire, twisted pair): provides 10-watt speaker audio to the control head(s) 156 for routing to internal or external speakers.

UNSW A+(#24 wire): provides low current backup power to options (such as voice guard 164).

IGN A+(#24 wire): provides a sense input to transceiver 152 which can be used as an optional sense lead (e.g., to prevent transmitter keying if vehicle ignition is turned off) (this information can also be transferred as a serial message).

SHIELD (stranded shield around entire cable): provides RF protection of the cable. It is grounded to the mobile transceiver 152, passed through all options without being connected to anything else, and is left open in all control heads 154.

MIC LO/AUDIO SHIELD, MIC HI, VOICE GUARD (VG) AUDIO HI (stranded shield, #22, #24): provides shielded mic audio to the mobile transceiver 152 or other options (e.g., vehicular repeater 156) and provides decrypted audio from the voice guard option 164 to the transceiver.

VG SHIELD, VG TX DATA, VG RX DATA (stranded wire, #24, ↓24): provides Vol/Squelch Hi or repeated TX data from transceiver 152 to all options (namely voice guard option 164 and vehicular repeater 156), and VG encrypted data or repeated RX data or repeated voice from an option to the transceiver. The transceiver 152 is informed ahead of time about the type of audio/data to be carried by these lines.

AUX (#24 wire): provides an external input/output line which can be used for control. Transceiver 152 may use this line to control the dual control head 154 audio relay. On the vehicular repeater option 156, this line is used to input the status of the repeater enable switch of the vehicular charger option.

SERIAL TX DATA, SERIAL RX DATA, SERIAL SERVICE REQUEST (#24, 190 24, #24 wires): provides control access to the transceiver 152 microprocessor all units communicate over this bus:

TX DATA: open collector output from the transceiver 152 to all options (each option has its own pull-up resistor on the line). Transceiver 152 transmits data to the other options over this serial bus line.

RX DATA: data is received by transceiver 152 from all options over the serial bus line. All options use open collector drivers. The only pull-up resistor resides in transceiver 152.

SERVICE REQUEST: Options pull this line low when they need to be polled to transfer messages to transceiver 152.

Command and Data Protocol for Communication Over Serial Bus

The protocol used in the preferred embodiment for communicating data and commands between transceiver microprocessor 152 and " options" (e.g., control head 154 and MDTI 158) is generally conventional (see, for example, messages described in U.S. Pat. No. 4,637,022 to Burke et al described above for an example of suitable serial bus message protocol and format). Each " option" (e.g., control head 154, MDTI 158 and MDT 162, voice guard 164, or vehicular repeater 156) is connected in parallel with all other options on serial data bus 153. In the preferred embodiment, each option has its own "instruction set" for message transfers which conform with an overall protocol. Transceiver 152 directly transfers data to all options over serial bus TX data line, since only the transceiver has authority to transmit on this line. However, since the options share the RX data line for transmitting signals to transceiver 152, no option is permitted to transmit data until it has first been polled by the transceiver.

FIG. 3A shows exemplary signalling timing for transmission of data or commands by an option (e.g., MDTI 158) to transceiver 152. At time $t_1$, the option "pulls down" the serial bus SERVICE REQUEST ("SERV REQ") line to inform transceiver 152 that it desires to transmit a message. Transceiver 152 senses that the serial bus SERV REQ line has been pulled down, but cannot tell which option wishes to transmit data to it. Therefore, at time $t_2$, transceiver 152 transmits a poll message on serial bus TX data line, and waits for receipt of a response. Only the option which has pulled down the SERV REQ line is permitted to respond to this poll (all other options sense that the SERV REQ line has been pulled down and do not attempt to respond to the poll). The option requesting communications over serial bus 153 then transmits a response to the poll on the serial bus RX data line (time $t_3$), this poll response specifying the address (identification) of the option. Transceiver 152 receives the option poll response, and then transmits another poll message on the serial bus TX data line (time $t_4$), this poll message being directed to the specific option requesting communications. When the option receives this second poll message from transceiver 152, it transmits (at time $t_5$) its data or command message over the serial bus RX data line to transceiver 152. The option "releases" the SERV REQ line at time $t_6$ to permit other options to transmit on serial bus 153.

FIG. 3B is a timing diagram of signals on serial bus 153 used to transmit a message from transceiver 152 to a selected option (e.g., MDTI 158). Because transceiver 152 is the only unit capable of transmitting on the serial bus TX data line, no preliminary polling is needed before the transceiver transmits a message. At time $t_1$, transceiver 152 simply transmits its message on the serial bus TX data line. Since only the options affect the state of the serial bus SERV REQ line, this line remains inactive (indicating that any option is free to request use of the serial bus RX data line by pulling down the serial bus SERV REQ line). The message transmitted by transceiver 152 on the serial bus TX data line contains a designation ("Unit ID") of the option which is to receive the message. When the designated option has correctly received the message, it transmits an acknowledge message on the serial bus RX data line (time $t_2$). In the preferred embodiment, an option does not need to request permission from transceiver 152 before transmitting an acknowledge on the serial bus RX data line, since a transceiver is "master" of this line and simply refuses to grant any other option the use of the line until it has received an acknowledge or no acknowledge message from the option it sent a message to or until a predetermined time period (e.g., 10 ms) has elapsed.

FIG. 3C is a timing diagram of signals appearing on serial data bus 153 when transceiver 152 attempts to transmit a message to an option but the option fails to correctly receive the message. If an option receives a message on serial bus TX data line which was intended for it but discovers an error in the message (e.g., calculated and transmitted checksum information do not match), the option requests retransmission of the message by transmitting a "retry" message on the serial bus RX data line (time $t_2$) Upon receiving the retry message, transceiver 152 retransmits the same message again (time $t_3$). If the option this time correctly receives the message, it transmits an acknowledgement message (time $t_4$) is the manner shown in FIG. 3B.

FIG. 3D shows the serial bus 153 signalling which occurs when a somewhat more difficult transmission error occurs. In the preferred embodiment, each message transmitted over serial bus 153 includes an indication of the number of data bytes it contains (since messages can contain a single data byte or a variable number of data bytes). When an option receives a message transmitted by transceiver 152 over serial bus TX data line (time $t_1$), it extracts the "number of data bytes" field from the message and expects to receive the number of data bytes specified by that field. If, however, the field indicates (or the option erroneously decides) that more data bytes are supposed to be sent in the message than transceiver 152 actually sends, the option assumes the checksum byte to be a data byte and waits for one or more additional bytes. After a predetermined time-out period, the option concludes that it missed some or all of the message and transmits a "retransmit" message to transceiver 152 on serial bus 153 RX data line (time $t_2$) Upon receiving this "retransmit" message, transceiver 152 retransmits the message from beginning to end (at time $t_3$) and the option acknowledges receipt of the message if it is received correctly:

If the receiving option or the transmitting transceiver 152 transmits a message which specifies that there are fewer message data bytes than are actually contained in the message, the result will be a checksum error—since the receiving option will erroneously assume a data byte of the message is the last (i.e., checksum) byte, the option will transmit a "retransmit" message, and transceiver 152 will retransmit the message.

FIG. 4 is a schematic diagram of the overall format of messages transmitted over serial data bus 153. Each message includes a message type field 575, a unit id field 577, a data type field 579, a "number of data bytes" field 581, one or more data bytes 583, and a checksum field 585.

In the preferred embodiment, message type field is three bits long and specifies type of message. One of eight possible message types can be specified in message type field 575 (e.g., data transfer, no acknowledge, acknowledge, etc.).

Unit id field 577 specifies the "hardwired" address of the option to which the message is addressed (and thus the type of option the message is addressed to, e.g., MDTI, control head, vehicular repeater, etc.). The following table sets forth exemplary unit id codes used in the preferred embodiment:

| UNIT ID | OPTION |
| --- | --- |
| 00 | VOICE GUARD 164 |
| 01 | single type A control head |
| 02 | single type B control head |
| 03 | single type C control head |
| 04 | single type D control head |
| 05 | vehicular repeater 156 |
| 06 | MDTI 158 |
| 07 | Desk top station |
| 08 | reserved |
| 09 | dual type A control head |
| 0A | dual type B control head |

-continued

| UNIT ID | OPTION |
|---|---|
| 0B | dual type C control head |
| 0C | dual type D control head |

In the preferred embodiment, the unit id field 577 is five bits long, providing sixteen unique addresses for up to sixteen different options (in the preferred embodiment, no more than five options at a time are ever connected to transceiver 152).

Data type field 579 is either two or three bits long in the preferred embodiment, depending upon the message type. Normally, data type field is three bits long to provide up to eight different data types for each message type. However, in the preferred embodiment, data type field 579 and " number of data bytes" field 581 are contained in the same 8-bit data byte. Most options connectable to serial data bus 153 can advantageously use more than four (and often all eight) different unique data types provided by 3-bit data type field 579. If data type field 579 is three bits long, however, the " number of data bytes" field 581 can only be five bits long if both fields are to " fit" within the same byte. The " number of data bytes" field 581 specifies the number of data bytes 583 contained in the message. If the " number of data bytes" field 581 is only five bits long, than a maximum of 31 data bytes 583 can be contained in the message.

Typically, however, a stream of data produced by MDT 162 often contains more than 31 data bytes, and the messages transmitted by the MDT are only of a few (less than four) limited data types (e.g., ASCII or binary).

Accordingly, in the preferred embodiment, all messages having a message type 575 (and/or unit ID field 577) designating MDT 162 have a data type field 579 which is only two bits long, and a " number of data bytes" field 581 which is six bits long—allowing MDT 162 to include as many as 64 data bytes in the same message. Additional flexibility is thus provided by making the length of the " number of data bytes" field dependent on the message type.

Message Control of Control Head 154

Control Head Switch Control

Control head 154 in the preferred embodiment includes two types of switches: rotary switches and push button/toggle switches. Push button/toggle switches are provided for push to talk, microphone hookswitch (operated by a " hook" or cradle on which the microphone is placed when not in use), " special call", and other functions.

Rotary switches are provided for volume control, group selection, and system selection. In the preferred embodiment, a user selects an individual or group to communicate with by selecting the " group number" corresponding to that group. The user also may select a " system number" to select between different logical sets of groups and/or different repeater sites. In the preferred embodiment, the control head group/system switches do not have stops, but are simply continuously-rotating switches with detents. Control head 154 includes conventional circuitry which senses whenever (and also how much) a rotary switch is rotated, and sends a message to transceiver 152 over serial data bus 153 indicating the direction of change in rotary switch position.

One of the messages control head 154 transmits to transceiver 152 over serial data bus 153 is a " rotary switch change" message which communicates the position of the control head volume knob. This command includes a single data byte and provides the following information: new rotary switch absolute position (5 lowest order bits B0-B4 of the data byte); an identification of the rotary switch that has changed position (bits 5,6 of the data byte); and a buffer overflow indicator (highest order bit 7 of the data byte). An exemplary typical " rotary switch change" message format is as follows:

Message type, Unit ID
Data type, number of data bytes=1
Volume level (5 bits), buffer overflow
Checksum However, in the preferred embodiment this " rotary switch change" message is typically not used to communicate information about the position of group and system rotary knobs. Rather, the " switch position" message used to report closure of push button/toggle switches is also used to report changes in the position of the control head group and system rotary switches. In this manner, the rotary switch (which is preferred by many public safety radio users) can be used while not limiting the range to the number of positions on the switch. A single bit is provided in the message for indicating the type of change in a control head push button/toggle switch, group rotary switch, or the system rotary switch. For push button and toggle switches, a first logic level in this bit place indicates that the switch has been released or turned OFF, and the opposite logic level indicates that the switch has been depressed or turned ON. For the rotary group and system switches, a first logic level in the data byte bit place indicates that the switch has been decremented once, and the opposite logic level in the bit place is used to indicate the switch position has been incremented once.

The " switch position" message also includes a single bit buffer overflow indicator which indicates whenever a switch has been operated multiple times since the last " switch position" message was sent (e.g., if the user extremely rapidly depresses and releases the microphone PTT switch during a time when transceiver 152 is conducting a lengthy message conversation with another option).

In the preferred embodiment, the " switch position" message is used to report only changes in switch position, and thus, specifies the identification of a single switch (it is extremely rare that a user will intentionally change the position of more than one switch at the same time) and the nature of the change. An exemplary format for the " switch position" message in the preferred embodiment is as follows:

Message type, Unit ID
Data type, No. of Data Bytes=1
Data Byte
Checksum where the single data byte lowest order six bits B5-B0 identifies the switch which has changed position, the bit in position B6 specifies the new switch status, and the bit in the most significant bit position B7 specifies whether a buffer overflow occurred.

Even though each " switch position" message is capable of communicating only one " increment" or " decrement" position of the group and system rotary switches, the signalling occurring over serial data bus 153 between control head 154 and transceiver 152 is so rapid that multiple messages are communicated in rapid succession as the user rapidly rotates the switches.

By translating rotary knob movement into single bit data which is in the same format as and is conveniently transmitted along with data specifying change in position of push button/toggle switches, the number of messages transmitted by control head 154 is dramatically reduced, and in addition, a special rotary message type otherwise required to report the absolute positions of rotary and system switches can be eliminated.

In the preferred embodiment control head switch status is requested by transceiver 152 whenever a power up or reset condition occurs. To request control head switch status, transceiver 152 transmits a " switch status request" message which requests the status of all push buttons and rotary switches. In response to this " switch status request" message, control head 154 transmits only a single message including multiple data bytes which specify the positions of all of the push button switches. In the preferred embodiment, control head 154 sends the type byte, bit status of the switches in the first two data bytes, followed by a byte containing the absolute position of the volume control. Although the absolute positions of the group and system rotary knobs are irrelevant (transceiver 152 being concerned only in changes in knob positions as has been described), the last byte specifies the absolute positions of the group and system rotary switches in case the need for such information arises in later versions of the transceiver 152 programming. After reset has completed, control head 154 automatically reports to transceiver 152 whenever group or system rotary knob positions change (and also whenever the position of any push button switch changes).

Control Head Display Control

Control head 154 in the preferred embodiment includes a digital display 556 having a longitudinal array of seven-segment LED (light emitting diode) alphanumeric displays. Transceiver 152 is capable of writing to selected displays in the array (in addition to performing other functions such as clearing on the entire display). In particular, transceiver 152 can send an " insert character" message to control head 154 which controls the control head to insert a character at a desired position in the array and to scroll additional characters in positions to the right of the character being inserted.

The character(s) to be inserted are specified by single data bytes defining the character values.

A typical display message in the preferred embodiment has the following exemplary format:
Message type, Unit ID
Data Type (display), No. of data bytes = 6
Insert character command
Start inserting at position x
value to be displayed in position x
value to be displayed in position x+1
value to be displayed in position x+2
value to be displayed in position x+3
Checksum This display control message is extremely versatile and flexible, and yet requires very little overhead to send and to execute.

Control Head Audio Control Command

Control head 154 in the preferred embodiment includes relay(s) 559 which can be remotely controlled by transceiver 152 to activate an external alarm and/or switch between an internal loudspeaker 552 mounted in the control head and an optional external speaker. An audio control command issued by transceiver 152 is used to control both of these functions. The audio control command is a single byte command in the preferred embodiment, and has the following exemplary format:
Message type, Unit ID
Data type, No. of Data bytes = 1
data byte
Checksum where the data byte includes a most significant bit B7 which specifies status (e.g., a first logic level = latched, a second logic level = unlatched) of a first relay (e.g., a relay which switches audio output between internal and external loudspeakers and/or switches an external alarm on and off) and the lower order bits identify which relay (speaker relay or alarm relay) is to be switched.

Vehicular Repeater (VRS) 156

The vehicular repeater (" VRS") 156 serves as an interface to portable radio transceivers operated in system 100. The VRS unit 156 in the preferred embodiment is a 16-PLUS transceiver 152 operated at high-band/UHF with a low power PA. The VRS unit 156 interfaces with the 16-PLUS transceiver 152 via a coupler and is directly connected via this coupler to serial bus 153. The VRS unit 156 has no displays—there is simply transfer of data and audio between the transceiver 152 and VRS unit 156. The following describes exemplary data formats used to communicate between transceiver 152 and VRS 156 on serial data bus 153.

Data Type φ VRS Status

The mobile 152-to-VRS 156 status message is used to inform the VRS of three pieces of information: the VRS unit id (12-bit logical id), status granted, and presence of the trunked control channel. The message is a 2-byte message with the following format:

| φ | SG | NCC | RS | LID HIGH FOUR BITS |
|---|----|----|----|----|
| ------------- | LID LOW EIGHT BITS------------(LSB) | | | |

The SG bit is set high in response to a status request from the VRS 156. The NCC bit is set high when the control channel is not available and communications cannot be maintained. The RS bit is set to request the VRS unit 156 to report current status. The 12-bit LID is the LID of the mobile for the selected system and should be the LID used by the transceiver 152 VRS 156 when attempting to assume priority status. Therefore, the typical message would have the following exemplary format:

| 25H | message type 1, unit id φ5 |
|---|---|
| φ2H | data type φ, number data types = 2 |
| 41H | status granted |
| 23H | LID = 123H |
| 9FH | checksum |

The VRS 156 sends a similar 1-byte status message to the transceiver 152 in order to request status or indicate that the repeater is on. The single byte is all zeroes except bit 6 (which is set to request status) and bit 5 (which is set indicating that the repeater is active). The typical message would have the following format:

| | |
|---|---|
| 25H | message type 1, unit id φ5 |
| φ1H | data type φ, number data types=1 |
| 6φH | request status, repeater on |
| 9EH | checksum |

Data Type 1 VRS Call Processing

The call processing data type is provided to allow the VRS 156 to request a channel or the transceiver 152 to transmit a message to portable radio transceivers (either directly or via the repeater site). The message requires two bytes in either direction because the message contains the LID of the calling/called unit.

The transceiver 152 originated call processing message is used to request a priority VRS 156 to key its transmitter either because the local user pressed PTT to talk from the mobile microphone or the transceiver 152 received a call to be repeated. The following information is sent in the two bytes: LID OK (bit 7 set indicates that the high six bits of the LID are known to be correct, bit 6 set indicates the low six bits of the LID are known correct), EMER (bit 5 set if the received call is an emergency call), PTT (bit 4 set if VRS 156 should stop keying, clear if VRS should start keying). The remaining twelve bits contain the LID in the format described under data type φ. The LID is the LID of the unit originating the call at the site. In the case of local audio where the VRS 156 should key as if it is a portable, transceiver 152 sends a LID of zero to indicate that the call does not involve the transceiver—just the portables. If a user is keyed at the transceiver 152 and calling through the repeater system, the user's LID will be used. (Note: VRS 156 should still use the MIC HI input for the source of audio if it happens to be the priority unit). A typical message is shown below:

| | |
|---|---|
| 25H | message type 1, unit id φ5 |
| 22H | data type 1, number data bytes=2 |
| C1H | LID ok, key VRS id priority |
| 23H | LID=123H |
| 3FH | checksum |

When VRS 156 receives a call from a portable, it sends a similar 2-byte message to the transceiver 152: bit 7 is zero, bit 6 controls whether speaker audio is from the transceiver or VRS (φ=VRS audio), bit 5 set indicates the received message is an emergency message, bit 4 corresponds to PTT (φ=key the transceiver, 1-unkey the transceiver), and the remaining twelve bits correspond to the LID which is to be used by the mobile to originate the call (typically the VRS LID) using the data format shown in data type φ. A typical message is shown below:

| | |
|---|---|
| 25H | message type 1, unit id φ5 |
| 22H | data type 1, number data types=2 |
| φ1H | VRS AUD to SPKR, key mobile, not EMER |
| 23H | LID=123H |
| FFH | checksum |

Data Type 4 VRS Audio Control Commands

The audio control commands are sent from the transceiver 152 to the VRS 156 to set all of the user controllable levels in the VRS. The message is a 2-byte message where the first byte is the ID of the setting to be changed (φ for volume) and the second byte is the new level to be loaded (five lowest bits for volume). A typical message is shown below:

| | |
|---|---|
| 25H | message type 1, unit id φ5 |
| 82H | data type 4, number data bytes=2 |
| 1φH | new volume level=16 (decimal) |
| 6DH | checksum |

Unit ID 6 Mobile Data Terminal Interface (MDTI)

The mobile data terminal interface (MDTI) is an option which contains two serial ports to communicate with vendor equipment (either MDT 162 or AVL's).

The message format to/from the MDTI 158 differs from the standard serial port message in that the data type/"number of data bytes" byte is broken down differently than for the other options. That is, there are only four data types and a maximum of 63 bytes in a single transfer.

Each MDT data transfer is a 2-step process in the preferred embodiment. The MDTI 158 or the transceiver 152 must first use the TRANSFER CONTROL message to request the transfer (i.e., find out the maximum number of data types which will be accepted) and then transfer data up to that maximum.

The protocol is designed to accept both MDT 162 and AVL data from the MDTI 158. Both forms of data are handled with the data type distinguishing between the two.

There are two basic forms in which the MDTI 158 may present data to the mobile: data control and actual data. The control data type is used to receive all information needed for the header and limit the amount of data transferred as well as to abort data transfers. The data transfer is used to transmit or receive data between the transceiver 152 and the MDTI 158. AVL data is transferred as the current location or no location available.

Data Type φ MDTI Data Transfer Control

The TRANSFER CONTROL message is used by MDTI 158 to request the transceiver 152 to transmit data with a given set of parameters. This message is also used by the receiving transceiver 152 to set up the transfer of data from a specified source. The following information is provided in this message: status/data call, abort current transfer, send data at high priority, group or individual call id (or use radio control head group and systems switch settings), port number, transmission complete, and encrypt vs. direct data. The exemplary format is shown below:

| 7 | 6 | 5 | 4 | 3 | 2 | 1 | φ |
|---|---|---|---|---|---|---|---|
| G | S | ( | | UNIT ID HIGH SIX BITS | | | ) |
| ( | | | UNIT ID LOW EIGHT BITS | | | | ) |
| ENC | PRI | RTS | ABT | TXC | SEL | (SPARE | ) |
| φ | | (SRC PORT #) | | | (DST PORT # | | ) |
| ( | | NUMBER FREE BYTES (MAX=63 | | | | | ) |

The first two bytes of this message are used to determine the type of call when transmitted from MDTI 158 to transceiver 152. If the S bit is clear, the call is group-/logical oriented and the id field contains the id to be called. The group bit is set to select the 11-bit group id and cleared to select the 14-bit logical id (if a LID of $\phi$ is loaded, the transceiver 152 will use the current radio settings).

If the S bit is set, the MDTI 158 is specifying the new status for the radio in the lower six bits of the id field. If status is being sent, the contents of the next three bytes are ignored. The ENC bit is used to select encrypted mode. The PRI bit is set to request that the data be sent at a high priority (e.g., emergency for clear voice). The RTS bit is used by the MDTI 158 to request that data be sent from the MDTI to the transceiver 152. The transceiver 152 must respond with the same message type telling the MDTI 158 how many bytes can be transferred. The ABT bit is set if the MDTI 158 is requesting the current transfer to be stopped prior to completion. The TXC bit is set if all data has been transferred from the originator. The SEL bit is set if the transceiver 152 is to select the group/individual id from the first two bytes without originating a call. The SRC PORT # is the source port from the MDTI 158 ($\phi$-7) and the DST PORT # is the destination port number of the receiving MDTI ($\phi$-7). The "number of free bytes" field is not used by the originator.

When this message is sent by a transceiver 152 to an MDTI 158, the first two bytes are used to give the MDTI the id of the unit that originated the call. If the S bit is set, the message is a request for the MDTI 158 to provide status and the id field is zeroed. The ENC and PRI bits are currently not used. The RTS bit is used to request a data transfer from the transceiver 152 to the MDTI 158. The MDTI 158 must respond with the same message type telling the transceiver 152 how many bytes can be transferred in the preferred embodiment. The ABT bit is set to tell the MDTI 158 that the transmission was prematurely aborted. The TXC bit is set to tell the MDTI 158 that all data has been transferred. The SRC PORT # is currently not used. The DST PORT # is used to specify the destination port number of the MDTI 158.

The following is an exemplary format for the MDTI data TRANSFER CONTROL message:

| | |
|---|---|
| 26H | message type 1, unit id $\phi$6 |
| $\phi$5H | data type $\phi$, number of bytes=5 |
| $\phi$1H | individual call |
| 23H | callee id=123 |
| 2$\phi$H | request to send data clear data |
| $\phi$1H | source port=$\phi$, destination port=1 |
| $\phi\phi$H | null when requesting to send data |
| F9H | checksum |

Data Type 1 MDT Type Transfer

The data transfer message is used to transfer data between the MDTI 158 to transceiver 152 to transmit the data over a radio channel. This message is also used by transceiver 152 after it has received data to transfer the data to the MDTI 158.

The format for this message consists of the message type byte and the number of bytes transferred. The maximum number of bytes that may be transferred is 63. The actual data bytes are next, followed by the checksum.

Mobile Data Terminal Interface 158

While many peripheral devices are capable of connecting directly to serial data bus 153, some devices the user may wish to connect to mobile transceiver 150 will be incapable of directly connecting to the serial data bus without being extensively modified.

For example, suppose a user wishes to connect a standard IBM PC compatible computer to transceiver 152 as a mobile data terminal 162. Such computers do not have 3-wire serial bus connections capable of connecting directly to serial data bus 153. However, such conventional off-the-shelf computers are capable of directly connecting to an RS-232D serial data bus (RS-232D being a standard promulgated by the EIA and for which much widely available literature exists, as those skilled in the art are aware). The preferred embodiment includes a mobile data terminal interface ("MDTI") 158 and associated command structure to interface the 3-wire serial bus 153 with any equipment capable of interfacing with a standard RS-232D (or similar) serial data bus.

Figure 5:
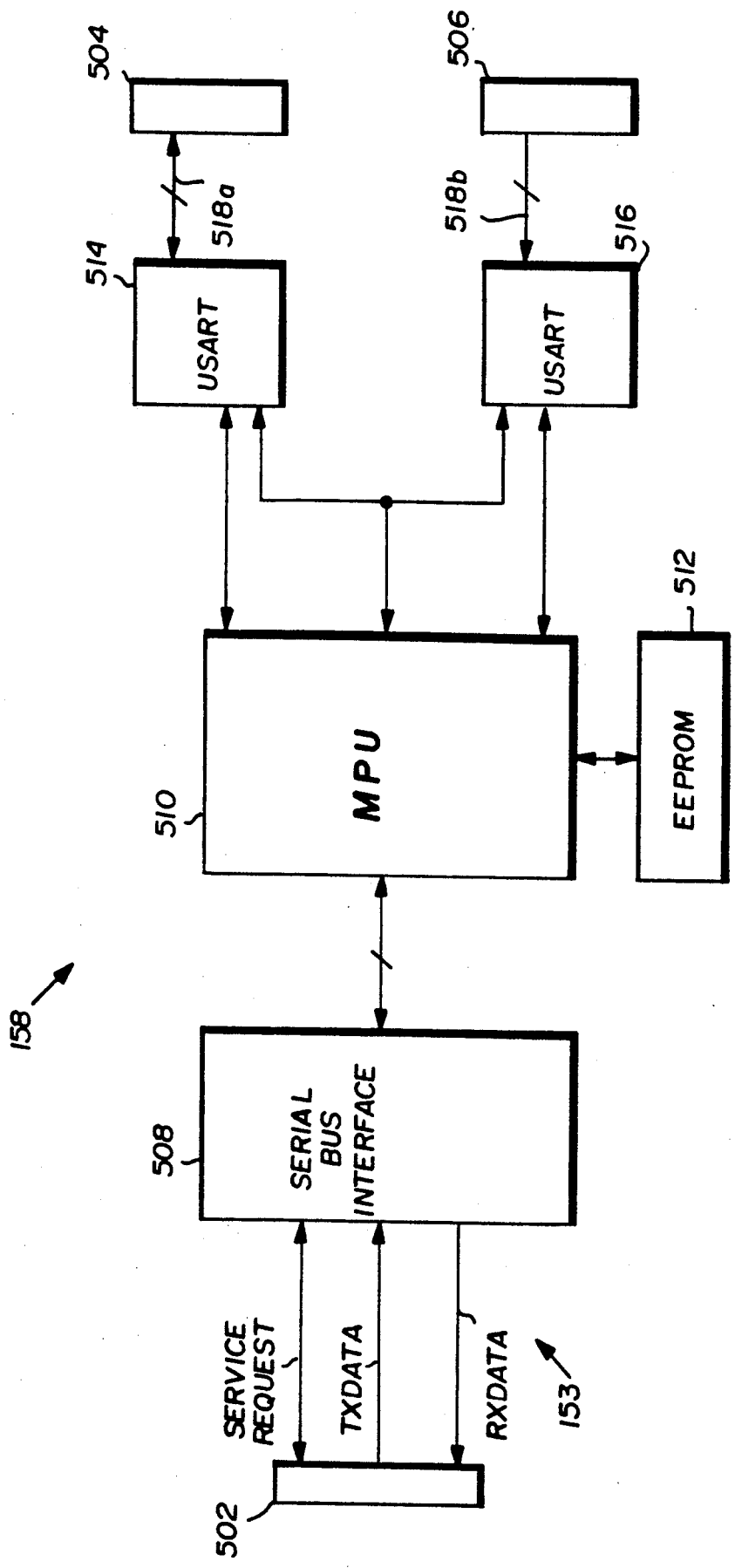
FIG. 5 is a schematic block diagram of the mobile data terminal interface shown in FIG. 2.

A detailed schematic diagram of mobile data terminal interface ("MDTI") 158 is shown in FIG. 5. MDTI 158 includes connectors 502, 504, 506; a serial bus interface 508; a microprocessor 510; an EEPROM 512; and USARTs ("universal synchronous/asynchronous receiver/transmitters") 514, 516.

Connector 502 is a standard DB9 connector which connects 3-wire serial bus 153 to serial bus interface 508 along with switched power and ground (connector 502 mates with control head connector 564 shown in FIG. 1). Serial bus interface 508 in turn is connected to the data port (and other connections) of a standard microprocessor 510. Microprocessor 510 is connected to a semiconductor memory device 512 which stores "personality" information defining the interface between MDTI 158 and an MDT 162 (e.g., baud rate, number of data bits, number of stop bits, parity, whether XON/XOFF data transfers are supported, whether modem control is supported, etc.). As will be explained, MDT 162 is capable of dynamically programming the contents of memory device 512 in the preferred embodiment.

Microprocessor 510 alternately writes to and reads from USART 514 (port 0) and USART 516 (port 1). USART 514 is connected to a standard DB9 connector 504 for connection to MDT 162 or other peripheral, while USART 516 is connected to a standard DB9 connector 506 for connection to another MDT or other peripheral (e.g., an automatic vehicle locator system). In the preferred embodiment, connectors 504, 506, and 508 are weatherproof connectors mounted on a weatherproof metal box housing the rest of the components of MDTI 158.

USARTs 514, 516 are standard off-the-shelf components which transmit and receive serial data streams either synchronously or asynchronously, as specified by a control output from microprocessor 510. These components 514, 516 pass serial data from microprocessor 510 to MDTs 162 connected to connectors 504, 506, respectively, and pass serial data from the MDTs to the microprocessor.

Connectors 504, 506 each have the following pin configuration in the preferred embodiment:

| FUNCTION | PIN# | FROM MDTI DATA | FROM MDTI CNTRL | TO MDTI DATA | TO MDTI CNTRL |
|---|---|---|---|---|---|
| Shield | 1 | | | | |
| TXD | 2 | | | X | |
| RXD | 3 | X | | | |
| RTS | 4 | | | | X |
| CTS | 5 | | X | | |
| DSR | 6 | | X | | |
| Ground | 7 | | | | |
| DTR | 9 | | | | X |

In the table set forth above, the TXD line ("transmitted data") carries a serial data stream from MDT 162 to MDTI 158, while the RXD line carries a serial data stream from the MDTI to the MDT. The control lines—RTS ("request to send"), CTS ("clear to send"), DSR ("data set ready"), and DTR ("data terminal ready")—are used to control the flow of data between MDTI 158 and MDT 162 when the MDTI is operating using modem control, as will be explained.

Connectors 504, 506 each provide a half/duplex serial link 518 which MDTI 158 operates in one of two modes: the modem-controlled binary transfer mode, and XON/XOFF data transfer without modem control.

When modem controls are disabled, the serial link 518 provided between MDTI 158 to MDT 162 has the following default characteristics: 9600 baud data transfer rate; and 10-bit data packets including 1 start bit, 7 data bits, 1 odd parity bit, and 1 stop bit. XON/XOFF data transfer control is provided by MDTI 158.

When modem controls are enabled, MDTI 158 defaults to a binary transfer mode in which no commands are accepted during a data transfer. The following describes the default characteristics of links 518 when modem controls are enabled: 9600 baud data transfer rate; and 10-bit data packets including 1 start bit, 8 data bits, 1 stop bit and no parity. When a data transfer is not in progress under modem control (as indicated by the DTR or DSR line being active), all of the normal protocol and command messages (to be described shortly) are accepted. In addition to the protocol control, hardware lines RTS and CTS can be used to regulate the flow of data (as will be described). If ASCII data is transferred under modem control, MDTI 158 will accept XON/XOFF commands during transfers to regulate the flow of data.

Figure 6:
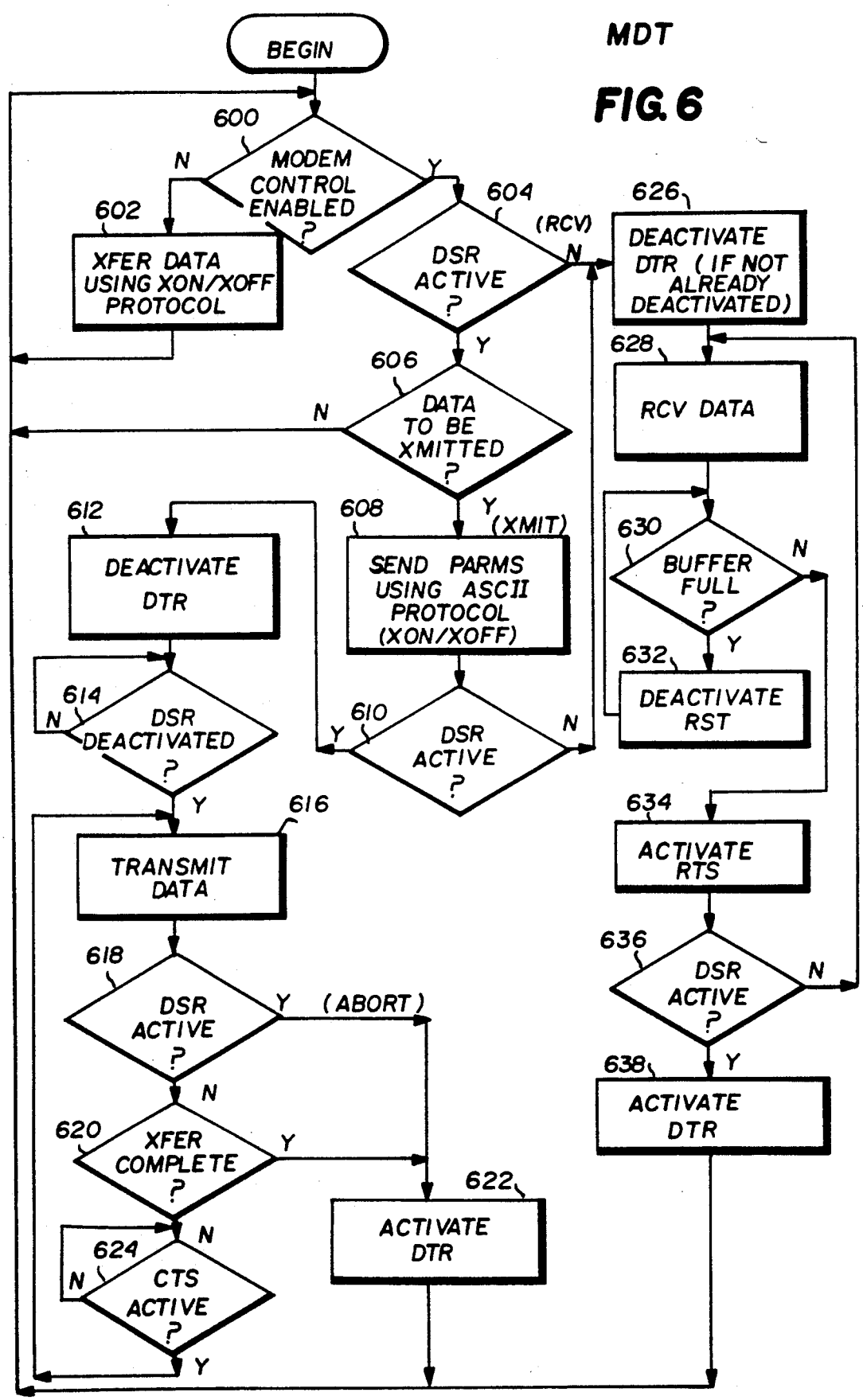
FIGS. 6, 7A and 7B are flowcharts of exemplary program control steps performed by the components shown in FIG. 2.

FIG. 6 is a flow chart of exemplary program control steps performed by MDT 162 to transmit and receive data from MDTI 158 over link 518, and FIG. 7 is a flow chart of exemplary program control steps performed by MDTI 158 to transmit data to and receive data from MDT 162 over the link.

Referring to FIG. 6, MDT 162 first determines whether modem control has been enabled (decision block 600). If modem control has not been enabled, then data is transferred using the command protocol to be described shortly (block 602).

If modem control has been enabled, MDT 162 determines the state of the DSR line (decision block 604). The DSR line is controlled by MDTI 158, and indicates whether or not the MDTI is ready to receive data (and also whether the MDTI wishes to transmit data to the MDT). No transfer from MDT 162 to MDTI 158 can be started until the DSR line is active.

If decision block 604 determines that the DSR line is active, MDT 162 knows it is permitted to transmit data to MDTI 158 and determines whether it has any data to transmit (decision block 606). If MDT 162 has no data to transmit, control returns to decision block 600 to determine whether modem control has been enabled. If there is data to transmit, on the other hand, MDT 162 may transmit parameters (e.g., the identification of the group or individual mobile transceiver or other station to receive the data) using the ASCII protocol commands to be explained in greater detail shortly (and using XON/XOFF to regulate data flow). After all such parameters have been transmitted to MDTI 158 (block 608), MDT 162 once again determines the state of control line DSR (since the MDTI might have issued a command via the ASCII protocol since the test of decision block 604 was performed) (block 610).

If decision block 610 determines the DSR line is still active, MDT 162 causes the DTR line to become inactive (block 612) and then waits for MDTI 158 to respond by causing the DSR line to become inactive (decision block 614). When MDTI 158 is ready to receive data, it deactivates the DSR control line, and MDT 162 begins to transmit data (block 616). While data is being transmitted, MDT 162 periodically checks the state of the DSR line (decision block 618) to determine whether it has become active (indicating the MDTI 158 has requested the MDT to abort the transmission).

If MDTI 158 causes the DSR line to become active, MDT 162 aborts the current data transmission and activates the DTR control line (block 620). If the DSR control line remains inactive, MDT 162 continues to transmit data until the transfer is complete (as tested for by decision block 620). MDT 162 indicates that data transfer is complete by activating the DTR line (block 622).

Data transmission by MDT 162 is temporarily suspended if MDTI 158 causes the CTS ("clear to send") line to become active (decision block 624). MDTI 158 causes the CTS control line to become active if, for example, its receive buffer has filled and there is consequently insufficient space to store additional data. MDT 162 waits until MDTI 158 deactivates the CTS line, and resumes data transfer at that time.

If decision 604 determines that MDTI 158 has caused the DSR control line to become active (indicating that the MDTI is to transmit data to MDT 162), the MDT deactivates the DTR control line (if it is not already deactivated) (block 626), and begins to receive data transmitted by the MDTI (block 628). If at any time the MDT receive buffer becomes full (block 630), MDT 162 deactivates the RTS ("request to send") line to temporarily suspend transmission of data by MDTI 158 (block 632). When the MDT receive buffer becomes empty once again, MDT 162 reactivates control line RTS (block 634) to permit further data to be transferred. When MDT 162 detects that the control line DSR has become active (decision block 636) (signifying that MDTI 158 is finished transmitting data), MDT 162 activates control line DTR (block 638) to positively indicate it detected the change in state of control line DSR.

Figure 7A:
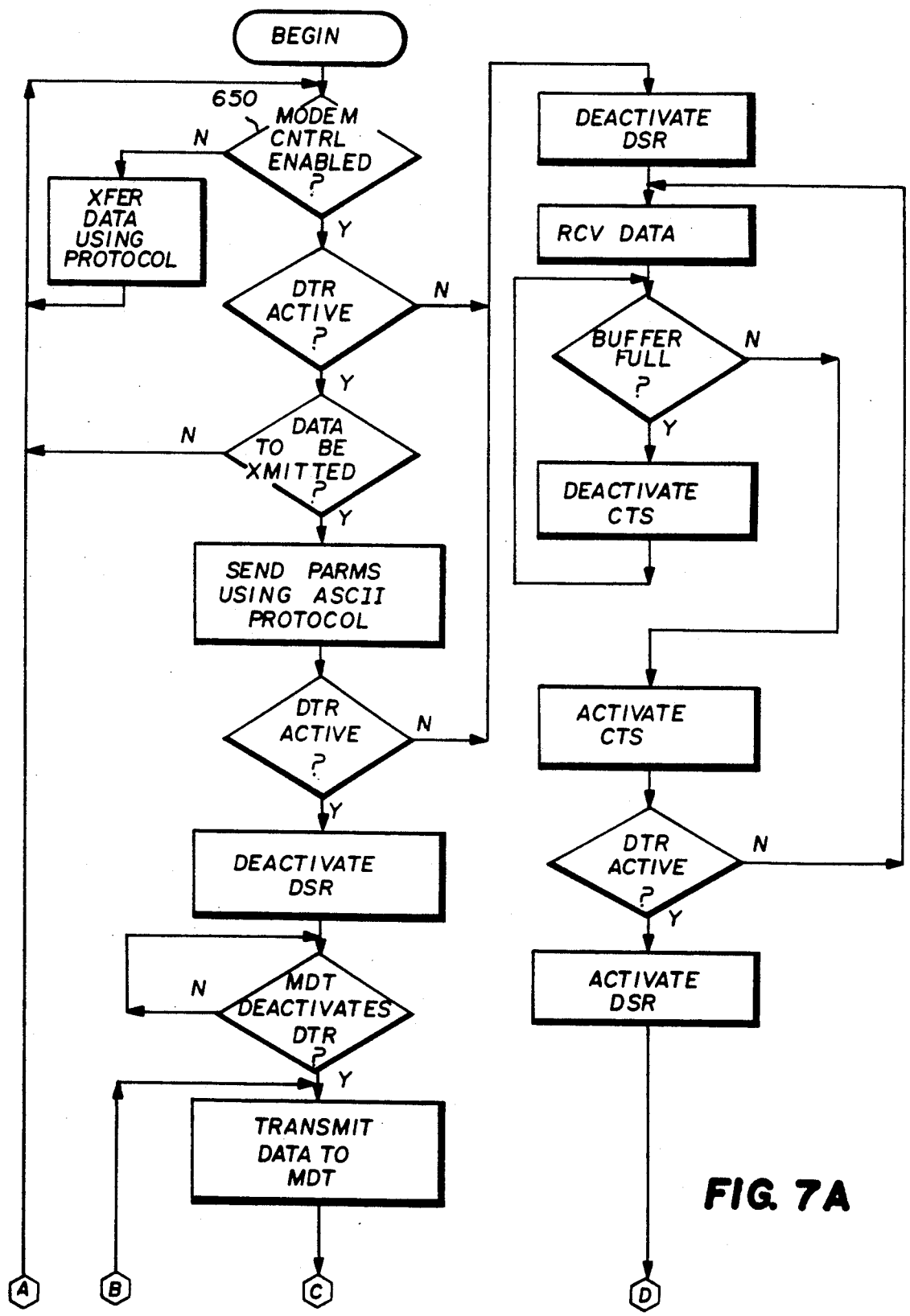
Figure 7B:
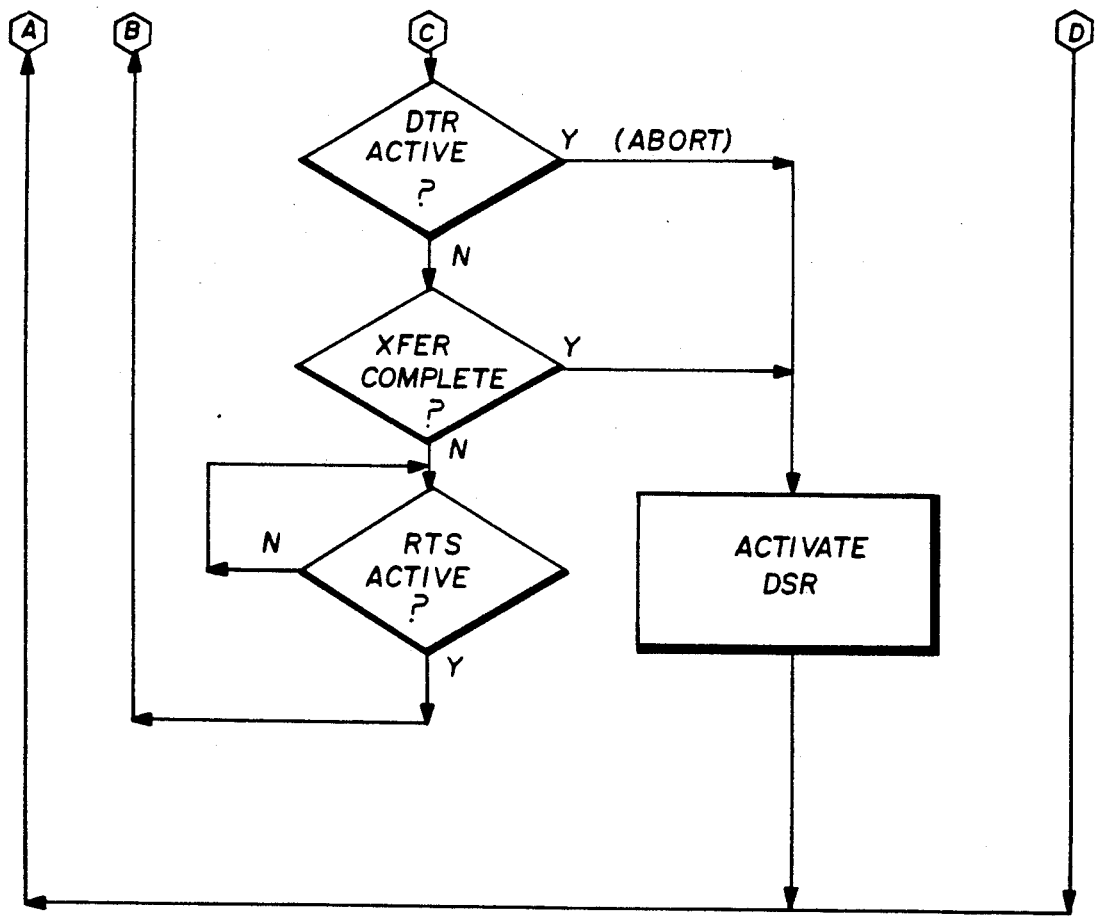

FIGS. 7A and 7B are is a flow of exemplary program control steps performed by MDTI 158 to transmit data to and receive data from MDT 162. The steps shown in FIG. 7 are virtually identical to those steps shown in FIG. 6 for MDT 162 except that MDTI 158 activates and deactivates the DSR line instead the DTR line, and activates and deactivates the CTS line instead of the RTS line MDTI 158 and MDT 162 coordinate data transfers between one another using a repertoire of commands which indicate the type of data (ASCII or binary) to be transferred and/or control the data flow (set the format, stop the current data transfer or other function). Each command is preceded by a control character which resets the command parse burfer in MDT 162 and/or MDTI 158—allowing for a new command to be entered. The commands used in the preferred embodiment are summarized below:

| NAME | NUMBER | DESCRIPTION |
|---|---|---|
| XFERA | 0 | Transfer ASCII bytes until STOP command is received |
| XFERB | 1 | Transfer a fixed number of binary bytes (0 to 2047 bytes) |
| XFERLA | 2 | Transfer ASCII data one line at a time (0 to 255 bytes per line) until a STOP command is received |
| FORMAT | 3 | Specify data format: bytes/packet, packets/burst, and voting |
| STOP | 4 | Terminate current command (except XFERB) |
| NULL | NO NUMBER | Cancel current data entry - used in XFERB to abort data on the current entry, reset command parse buffer |
| RETRANSMIT | NO NUMBER | Resend last data message |
| ACKNOWLEDGE | NO NUMBER | Acknowledge command line |
| NOACK | NO NUMBER | No acknowledge command line (retransmit) |
| XON/XOFF | NO NUMBER | Controls data flow during XFERA and XFERLA modes of operation |
| PROGRAM | 5 | Program the MDT interface parameter (e.g., baud rate, parity, number of data bits, XON/XOFF, and modem control |
| SPECPORT | 6 | Specifies destination port for data |
| STATUS | 7 | Select/request current status |
| ERROR | 8 | Informs MDT/MDTI of any error conditions |
| LOGIN | 9 | Used by MDTI to prevent unauthorized use of MDTI |

A description of each of these commands used in the preferred embodiment follows.

0.1 XFERA—CONTINUOUS ASCII TRANSFER

This command is used to transfer a continuous stream of ASCII characters from the MDT to a unit (e.g., the MDT of another mobile radio transceiver) specified by the MDT. The data transfer continues until a STOP command is received by the MDTI.

The exemplary format for this message is:

<cntrl D>Oesdtggggg<CR>
(note: cntrl D = "EOT")
where e,s,d,t,g = '0','1','2',...,'9'
e = encrypted data (0=nonencrypted)
s = source port number (0-7)
d = destination port number (0-7)

| t = call type: | 0 - | use radio settings |
|---|---|---|
|  | 1 - | call multiple units on group 'ggggg' with no acknowledges |
|  | 2 - | call individual 'ggggg' with acknowledges |
| ggggg = |  | group id to call (00000 to 02047) or individual id to call (00000 to 04095) |

EXAMPLE

<cntrl D>0000201234<CR>

The above example is used to begin continuous transfer of ASCII data from the MDT to the unit with individual (or logical) ID 1234 on port 0.

0.2 XFERB—FIXED LENGTH BINARY TRANSFER

This command is issued to transfer a fixed number of binary data bytes from the MDT to the specified unit(s). Since the data is binary, no control commands embedded within the data stream are recognizable so the transfer process cannot be interrupted until all the bytes have been transmitted.

An exemplary format for this message is:

<cntrl D>1esdtggggnnnn<CR>
where e,s,d,t,g,n = '0','1','2',...,'9'
e = encrypted data (0=nonencrypted)
s = source port number (0-7)
d = destination port number (0-7)

| t = call type: | 0 - | use radio settings |
|---|---|---|
|  | 1 - | call multiple units on group 'ggggg' with no acknowledges |
|  | 2 - | call individual 'ggggg' with acknowledges |
| ggggg = |  | group id to call (00000-02047) or individual id to call (00000-04095) |
| nnnn = |  | number of binary bytes to be transferred (00000-02047) |

EXAMPLE

<cntrl D>10002012340135<CR>

The above example is used to initiate a transfer of 135 bytes of binary data from the MDT to the unit with individual (or logical) id 1234 on port 0.

0.3 XFERLA—ASCII LINE-BY-LINE TRANSFER

This command is used to transfer ASCII data line by line from the MDT to the specified unit(s). A line may contain up to 255 bytes. A complete line can be terminated by sending the NULL command sequence (to be described shortly). The XFERLA sequence can be terminated by sending the STOP command sequence.

When in the XFERLA mode, all <LF> (line feeds) generated by the MDT are ignored by the MDTI. Lines are delineated by a <CR> (carriage return characters). The exemplary format for this message is:

<cntrl D>2esdtggggg<CR>
where s,d,t,g = '0','1','2',...,'9'
e = encrypt data (0=nonencrypted)
s = source port number (0-7)
d = destination port number (0-7)

| t = call type: | 0 - | use radio settings |
|---|---|---|
|  | 1 - | call multiple units on group 'ggggg' with no |

|   |   | acknowledges |
|---|---|---|
|   | 2 - | call individual 'ggggg' with acknowledges |
| ggggg = |   | group id to call (00000-02047) or individual id to call (00000-04095) |

EXAMPLE <cntrl D>2000201234<CR>

The above example is used to set-up line-by-line ASCII data from the MDT to the unit with individual (or logical) id 1234 on port 0.

0.4 FORMAT

This command is used to specify the data format to be used in the data transfer between MDT and MDTI to follow.

The exemplary format for this message is:

<cntrl D>30pxxyy<CR>
where p,x,y = '0','1','2',...,'9'
xx = bytes per packet
yy = packets per burst
0 = priority:  0 - normal priority
               1 - high priority

EXAMPLE

<cntrl D>301632<CR>

The above example is used to specify the data format for the next command as 16 bytes per packet and 32 packets per burst at normal priority.

0.5 STOP COMMAND

This command is used to stop (complete) all data transfers except the XFERB transfer.

The exemplary format for this message is:

<cntrl D>4<CR>

0.6 NULL COMMAND

This command is used in the XFERLA mode to terminate an input line. The line is cleared when the <cntrl D><CR> (both characters) sequence is received.

When entering a command, a <cntrl D> causes the command parse buffer to be cleared, allowing a new command to be entered. Therefore, if an error is made on the input command line, it can be cleared by sending <cntrl D> and sending the correct command. If a <cntrl D><CR> is received (e.g., by the MDT), a <CR><LF> will be echoed back to cause the MDT to go to the next line.

The exemplary format for this message is:

<cntrl D><CR>

(<CR> is optional)

0.7 RETRANSMIT

This command is used to request that a data message be retransmitted in either direction. When a "dumb" MDT is used, this message causes display of "RTR" at the end of the line as a visual indicator to re-enter the data and also sounds the terminal bell. For an intelligent MDT, the sequence requests the data to be retransmitted automatically and can be used in either direction.

The exemplary format for this message is:

<cntrl D> RTR <cntrl G><CR>

0.8 ACKNOWLEDGE

This message is used to acknowledge command or data transfers. If t=<LF>, the message is used to acknowledge a command line. If a "dumb" terminal is used as the MDT, the message will cause the MDT to reset the terminal cursor to the start of the next line. If an "intelligent" MDT is used, the command is simply an acknowledge that the two units are now ready to transfer another command or additional data. If t=0, the message is used to acknowledge data transfers. If t=1, the message is used by the MDTI to request an overall message acknowledge prior to sending the final acknowledge over the RF path. The MDT should respond to this request with an ACK if the message is OK or with a NOACK if a complete retransmit is necessary.

The exemplary format for this message is:

<cntrl F>t<CR>

(note: F="ACK")

0.9 NOACKNOWLEDGE

The exemplary format for this message is:

<cntrl U> RTR<CR>

(note: cntrl U="NAK")

This message is used to request retransmission of a command line. If a "dumb" terminal is used for MDT 162, the message will display an "RTR" at the end of the command line and move the cursor to the start of the current line (i.e., no <LF>). An "intelligent" MDT will automatically retransmit the command line in response to this message.

0.10 XON/XOFF

The exemplary format for this data is:

<cntrl S> OR <cntrl Q>

(note: or "DC1"/"DC3")

These control commands are accepted/issued when the MDTI 158 is in an ASCII data transfer mode. They are used to stop and start data transfers when the internal buffers are full. In the binary transfer mode (XFERB), the modem control lines CTS, RTS are the only way to temporarily stop the data transfer.

0.11 PROGRAM

The exemplary format for this data is:

|   |   |
|---|---|
| <cntrl D>5nbbbbdpsxmac<CR> | |
| where n,b,d,x,m,a = '0','1','2',...,'9' and | |
| p = | 'N','O','E' |
| n = | port number (0–7) |
| bbbb = | baud rate - 0300,1200,2400,4800,9600 |
| d = | number of data bits (7 or 8) |
| s = | number of stop bits (0,1, or 2) |
| p = | parity - none (use as stop bit), odd, or even |
| x = | XON/XOFF control - 1 - MDT supports XON/XOFF |

| | | |
|---|---|---|
| m = | modem control - | 0 - MDT does not support XON/XOFF<br>1 - MDT supports hardware modem control<br>0 - MDT does not support hardware modem control |
| a = | AVL/MDT - | 0 - specified port is an MDT port<br>1 - specified port is an AVL port |
| c = | port concentrator - | 0 - no concentrator, second port can be enable for MDT communication<br>1 - port concentrator enabled |

Note: if a port concentrator is used, only one of the MDTI 158 ports 504, 506 should be defined as an MDT port. If a concentrator is not used, both ports 504, 506 can be used for MDT communication. (Note: A 1 will only be accepted in the definition of port 0.)

This command is used to change the current setting of the MDTI 158 to MDT 162 interface. The command is required at the line of initial configuration and when changed, it becomes the new permanent setting (i.e., it is stored in the EEPROM 512).

EXAMPLE

<D>5024008N21000<CR>

The above example changes the MDT port interface to 2400 baud, 8 bit data, no parity, 2 stop bits, XON/XOFF enabled, modem control disabled, no port concentrator.

0.12 SPECPORT

This command is used to change the destination for all data from a given port on MDTI 158. Once specified, the MDTI 158 will transmit data to that port until another SPECPORT command is issued. The MDTI processes all received data regardless of which port it is received on no matter what port is specified by the SPECPORT status. The default at power-up is to direct all data to port 0 (which by definition is the MDT, not AVL port). The main use of this command is to allow the AVL port to be used as a second MDT port.

The exemplary format for this data is:

| | | |
|---|---|---|
| <cntrl D>6alsdtggggg<CR> | | |
| where a,l,s,d,t,g = '0','1','2',...,'9' | | |
| a = | code for the originating device | |
| l = | line/local select - | 0 - locally directed data<br>1 - transmit data over RF |
| s = | source port number (0-3) | |
| d = | destination port number (0-3) | |
| t = | id type - | 0 - use radio settings<br>1 - select group 'ggggg'<br>2 - select individual 'ggggg' |
| ggggg = | group id to call (00000-02047) or individual id to call (00000-04095) | |

EXAMPLE

<cntrl D>60001000000<CR>

The above example directs all port 0 activity to be locally directed to port 1 with no id specified.

0.13 STATUS

This message is used by the MDT 162 to set the status/message type of the mobile 150. The mobile 150 allows for one status and one message at any given time, so no port number is attached to this message. Any port can send the message—with the last one received updating the state of the radio 150. When using this message, the MDT 162 uses type 1 or 2 to alert the mobile 150 of the status or message. If the MDT 162 is a controller, the controller uses type 0 to request a status, and then specifies the logical id to be called for single unit or the group to be called if subsequent polling of a group is to be done on the working channel. Once an ACKNOWLEDGE is received, the controller then polls any desired unit using the above message until a STOP command is received.

When the mobile 150 receives a request for status, it will broadcast the message to all known ports using type 0 to indicate the request for status. The MDT 162 will then display the appropriate message on the screen requesting the user to update current status. If the mobile 152 does not get a response in the allowable time, it will send the last known status.

The exemplary format for this message is:

| | | |
|---|---|---|
| <cntrl D>7tlggggg<CR> | | |
| where t,l,g = '0','1','2',...,'9' | | |
| t = | status type - | 0 - request status<br>1 - send status<br>2 - send message |
| l = | group/logical - | 0 - for group status request<br>1 - for individual status request |
| ggggg = | status/message number (00-31) or group/logical id for status request | |

0.14 ERROR

The exemplary format for this message is:

| | | |
|---|---|---|
| <cntrl D>8ee<CR> | | |
| where e = '0','1','2',...,'9' | | |
| ee = | error code - | 00 = site not available (e.g., out of range)<br>01 = requested call denied<br>02 = requested call pending |

This message is used to inform the MDT 162 when a call fails to be processed. If the site is not available, the message will be sent back in response to the XFERA, XFERLA, or XFERB commands. In binary mode, the MDTI 158 will not permit an acknowledge to MDT 162 if the site is not available. If the site responds to a request with a call pending or call denied, the MDT 162 will be so informed that the call is pending (up to 30 seconds). If no response is heard within that time, the MDT 162 should request the call again if so desired. If the call is denied (e.g., the user is not allowed on a particular system), error code 2 is sent indicating the mobile 152 will take no further action.

0.15 LOGIN

The exemplary format for this message is:

```
        <cntrl D>9111111111<CR>
where 1 =    '0','1','2',...,'9'
111111111 =  login code
```

The purpose of the login code is to prevent unauthorized access to the system by non-licensed equipment. A port is accessible only if the device sends the correct login code after power-up. When the MDTI 158 resets, it will send a <cntrl D> LOGIN: <CR> to request a login from the option (MDT 162). This number is compared with an encrypted number stored in the MDTI 158 to verify the user is allowed on the system. If a device has not logged in and requested to send data, the login request is sent instead of an ACKNOWLEDGE. Once the option sends the login code, the MDTI 158 becomes fully functional.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of communicating digital data messages between a control head including a rotary switch and a digital mobile radio frequency transceiver over a serial data bus, said method including:
   (1) sensing changes in position of said control head rotary switch;
   (2) if said sensing step reveals said switch position has changed position, determining the direction of said position changes; and
   (3) transmitting a multi-bit length message from said control head to said transceiver over said serial data bus whenever said sensing step (1) reveals said switch position has changed, including transmitting a single bit within said message having a first logic level if said determining step determines said switch position changed in a first direction and having a second logic level if said determining step reveals said switch position changed in a second direction opposite said first direction.

2. An apparatus for communicating digital data signals between a digital mobile radio frequency transceiver and a control head including a rotary switch over a serial data bus, comprising:
   digital logic control means for detecting changes in position of said control head rotary switch and for indicating the direction of said position changes,
   wherein said digital control means further comprises means for forming and transmitting a switch position message from said control head to said transceiver over said serial data bus whenever said digital logic control means detects that said switch position has changed, and
   wherein said message comprsies a sequence of bits and includes a single bit having a first logic level if said switch position is changed in a first direction and having a second logic level if said switch is changed in a second direction opposite to said first direction.

3. An apparatus for communicating digital data signals between a digital mobil radio frequency transceiver and a control head as in claim 2, wherein said digital logic control means comprises a microprocessor controller.

4. An apparatus for communicating digital data signals between a digital mobil radio frequency transceiver and a control head as in claim 2, wherein said siwtch position message comprises a plurality of serial data fields including:
   a message-type field;
   a unit ID field;
   a data-type field;
   a data-byte field;
   a field indicating the number of data bytes transmitted;
   and a checksum field.

5. In a mobile radio transceiver system having a digital logic control head, said control head including rotary and push button or toggle type switches for selecting transceiver operating conditions, a method for translating rotary switch movement in said control head into data for transmission over a serial data bus to a digital mobiel radio transceiver utilizing the same serial data message format employed for communicating push button or toggle switch position changes, said method including:
   (1) sensing rotational movement of said control head rotary switch;
   (2) determining the directional nature of said movement, if said sensing step (1) reveals that rotational movement of said rotary switch has occurred;
   (3) transmitting a message of the same serial data message format employed for communicating push button or toggle switch position changes from said control head to said transceiver over said serial data bus whenever said sensing step (1) reveals that movement of said rotary switch has occurred, including transmitting a single bit within said message having a first logic level if said determining step (2) determines said switch position changed in a first direction and having a second logic level if said determining step (2) reveals said switch position changed in a second direction opposite said first direction.

6. In a digital mobile radio transceiver system utilizing a control head, said control head including rotary and push button or toggle type switches for selecting transceiver operational functions, a method for sensing and communicating the occurrence and direction of rotational displacement of a rotary switch position between said control head and a transceiver over a serial data bus using a single serial data messager format normally used for communicating push button or toggle switch positional change information, said method including:
   (1) sensing the occurrence of a rotational displacement of said rotary switch;
   (2) determining the direction of rotational displacement of said rotary switch;
   (3) generating a multi-bit length data message specifying a rotary switch ID and including a single bit within said data message having a first logic level if said determining step reveals said rotary switch was displaced in a first rotational direction and having a second logic level if said determining step reveals said rotary switch was displaced in a second rotational direction opposite said first direction; and (4) serially transmitting said data message to said transceiver via said serial data bus.

7. In a digital mobile radio transceiver system having a transceiver controller and a remote control head, an apparatus for sensing and communicating the occurrence and direction of rotational displacement of a rotary switch between said control head and said transceiver controller, comprising:

at least one continuously rotatable switch included with said control head for allowing rotational selection of transceiver operational function information;

a serial data bus coupled between said control head and said transceiver controller; and digital control logic means within said control head for monitoring rotational displacement of said rotary switch and for generating and transmitting a serial data message including a sequence of bits to said transceiver controller via said serial data bus in response to detecting the occurrence of rotational displacement of said rotary switch;

wherein said serial data message includes a single predetermined bit having a first logic level if said rotational displacement occurs in a first direction and having a second logic level if said rotational displacement occurs in a second direction opposite said first direction.

8. An apparatus as in claim 7 wherein said serial data message includes a message-type field and an error checking field.

9. An apparatus as in claim 7 wherein said serial transceiver controller is a microprocessor.

10. An apparatus as in claim 9 wherein said digital control logic means is a microprocessor.

11. An apparatus as in claim 7 wherein said selectable operational function information includes group number information, system number information and audio volume information.

* * * * *